United States Patent [19]
Jerry

[11] 3,775,017
[45] Nov. 27, 1973

[54] AUTOMOBILE HAND SPRAY WASHERS

[75] Inventor: Frederick Lonnie Jerry, Detroit, Mich.

[22] Filed: May 11, 1972

[21] Appl. No.: 252,209

[52] U.S. Cl.............. 401/266, 15/244 R, 285/419, 401/203
[51] Int. Cl............................................. A47l 13/23
[58] Field of Search.................. 15/104.94; 239/526, 239/530; 285/243, 373, 419; 401/42, 43, 203, 204, 266, 289

[56] References Cited
UNITED STATES PATENTS

| | | |
|---|---|---|
| 2,526,119 | 10/1950 | Cravis .................................. 401/204 |
| 2,583,432 | 1/1952 | Leverock ............................ 401/203 |
| 3,070,826 | 1/1963 | Paterno............................... 401/204 |
| 3,161,905 | 12/1964 | Dryden ............................... 401/204 |

FOREIGN PATENTS OR APPLICATIONS

| | | |
|---|---|---|
| 271,593 | 11/1966 | Australia............................. 401/203 |

*Primary Examiner*—Daniel Blum

[57] ABSTRACT

A sponge type washer having hinged sections forming a hollow handle with means for attachment to a pipe sleeved thereover or, alternatively, to receive a nozzle in the hollow handle. The sponge cleaning element has a passageway therethrough that communicates with the hollow handle for conducting liquid to the work.

2 Claims, 7 Drawing Figures

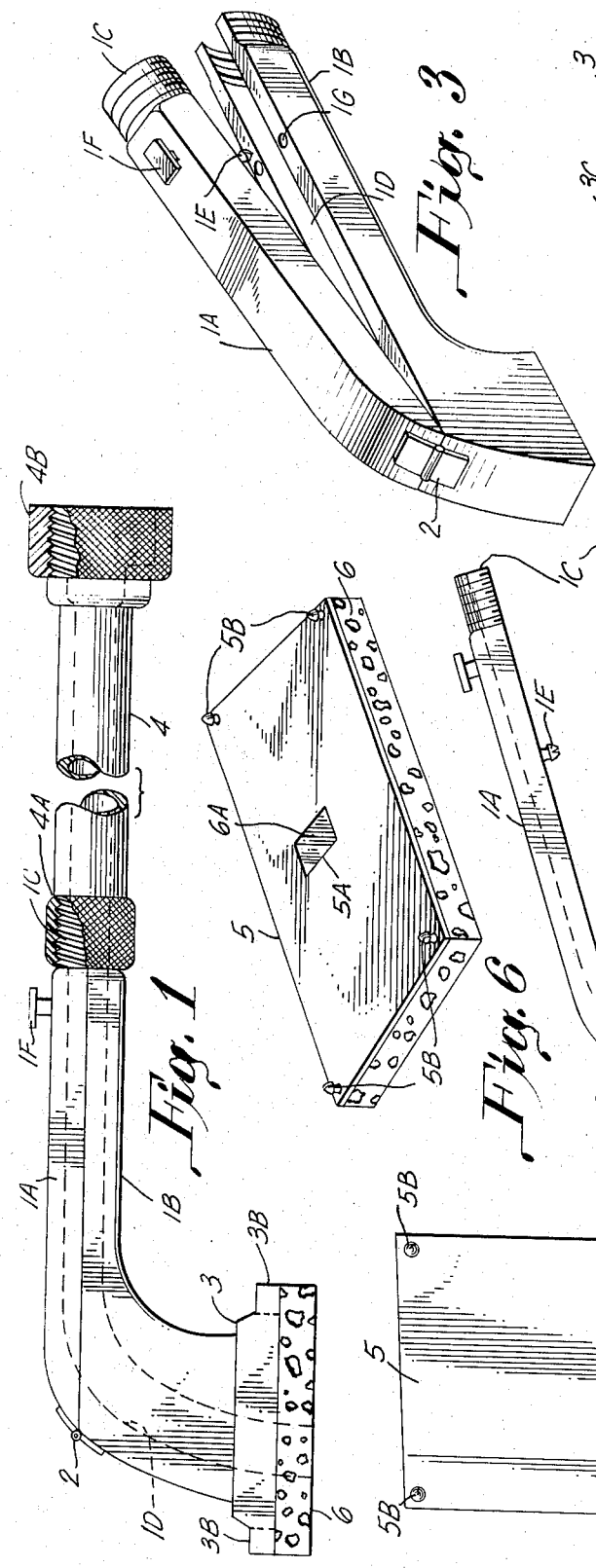
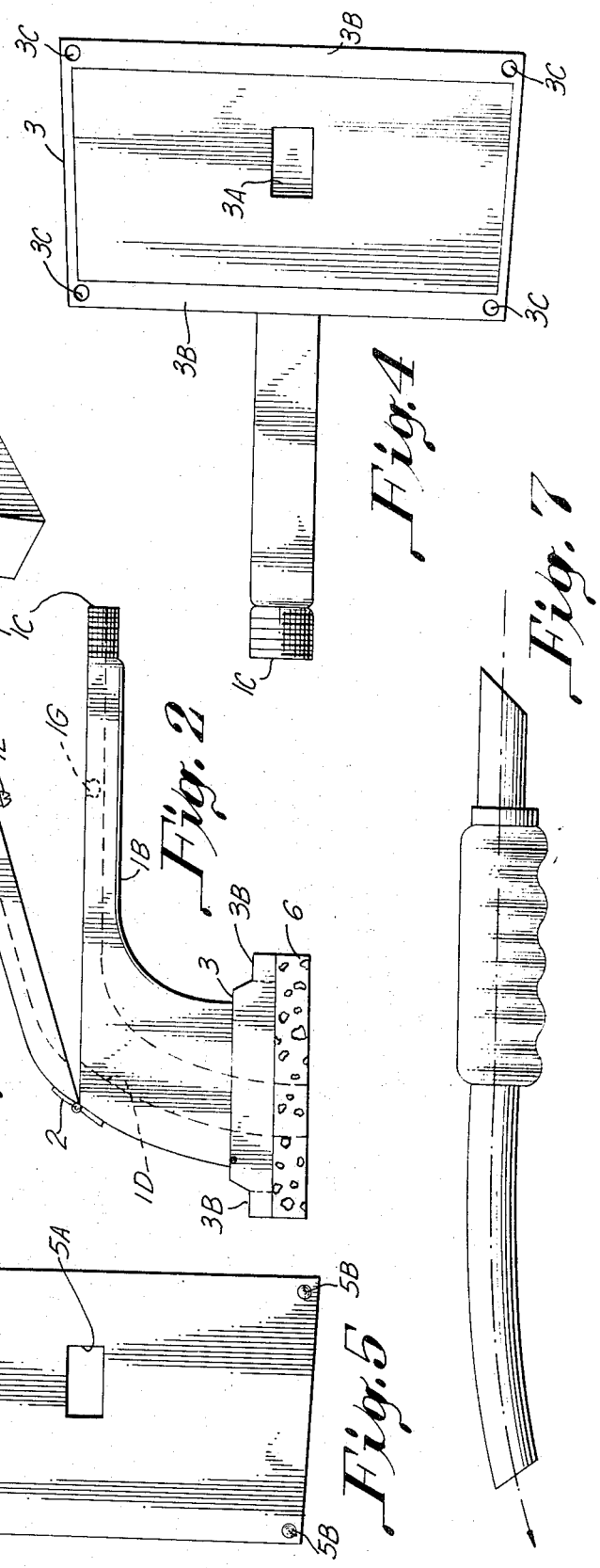

AUTOMOBILE HAND SPRAY WASHERS

SUMMARY OF THE INVENTION

The prime objective of the invention is to devise an automobile hand spray washer that would protect the user from getting wet while washing his automobile.

Another object being to devise an automobile hand spray washer that has sponge means for cleaning, that would make it impossible to scratch the surface of the automobile and maintain its shape longer than other washers of this type.

Still another object being to devise an automobile hand spray washer that could be attached to a automobile hand spray nozzle of the type found in a 25 cent self-service automobile hand spray washer; that does not have the sponge means of cleaning. These and other points that might be pointed out I have attained in the accompanying illustrations, specification, claims and drawings of which;

DETAIL OF THE DRAWINGS

FIG. 1 is a elevation view with a cut-away section of the entire automobile hand spray washer.

FIG. 2 is a elevation view of the automobile hand spray washer without the pipe handle connected.

FIG. 3 is a perspective view of the spray head showing the arrangement of the fastenings.

FIG. 4 is a bottom plan view of the Automobile Hand Spray Washer without the pipe handle or the sponge head.

FIG. 5 is a plan view of the sponge backing.

FIG. 6 is a perspective view of the sponge head.

FIG. 7 shows a nozzle utilized in a self-service auto washer.

The entire automobile hand spray washer is made of plastic with the exception of the sponge sole 6. Spray head is made in two parts 1A and 1B, with a cavity 1D that extends the entire length of the said two parts 1A and 1B, that are connected together by a hinge 2. Past 1A is made with male fasteners 1E and a knob 1F. Part 1B is made with female fastening cavities 1G and is molded or made with a shell like base 3. Base 3 is made with a space 3A in the middle and flanges 3B in the front and back, that have female fastening cavities 3C in each of its corners. The pipe handle 4 is provided with a threaded connection 4A at the end connecting it to the said spray head threaded ends 1C, and a threaded connection 4B at the other end whereby a water hose can be connected. The sponge sole holder 5 is made with a space 5A and male fastenings 5B in each of its corner that fit into the female fastening cavities 3C, securing the sponge sole holder to the said shell like base 3. The sponge sole 6 is made with a space 6A in the middle and is glued to the sponge sole holder 5.

HOW TO USE AUTOMOBILE HAND SPRAY WASHER

1. To wash your car at home with the automobile hand spray washer, connect it to a water hose and turn on the water. Apply the automobile hand spray washer to the surface of your car and push and pull the washer by its pipe handle in a forward and backward motion; in conjuction with the water passing thru the pipe handle and the opening made in the sponge, will wash and clean your car.

2. To use the automobile hand spray washer at a 25 cent self-service car washer, follow the following instructions:

a. Disconnect the pipe handle from the Hand Spray Washer.
   b. Pull up on the knob opening the Hand Spray Washer's head; place the 25 cent car washer spray nozzle in the cavity provided in the said spray head and fasten it therein by the male and female fasteners snugly and secure. Then proceed to operate the 25 cent self-service car washer as instructed.

I claim the following;

1. A sponge washer for cleaning automobiles comprising a head that includes a hollow top and hollow bottom hinged together at one end thereof for movement to an open and closed position, the top and bottom having snap coupling means for retaining them in closed position, said top and bottom forming a conduit when in said closed position; a knob on the top to facilitate movement thereof; a base having an opening communicating with the conduit secured to the bottom, said base having depending flanges at its periphery forming a shell open at its bottom; a sponge having a backing secured thereto, said backing being provided with an aperture; fastening means securing the backing to the base flanges, said backing substanially closing the open bottom of the base, and said top and bottom adapted to be connected to a pipe handle sleeved over the end opposite the hinge or, alternatively, to receive a nozzle in the conduit.

2. A sponge washer as defined in claim 1 wherein the sponge is provided with a passaway communicating with the aperture in the backing, and said fastening means comprising snap coupling means.

* * * * *